Feb. 19, 1952 W. A. S. HARMON 2,586,223
PRODUCE UNWRAPPING DEVICE
Filed June 28, 1948 2 SHEETS—SHEET 1
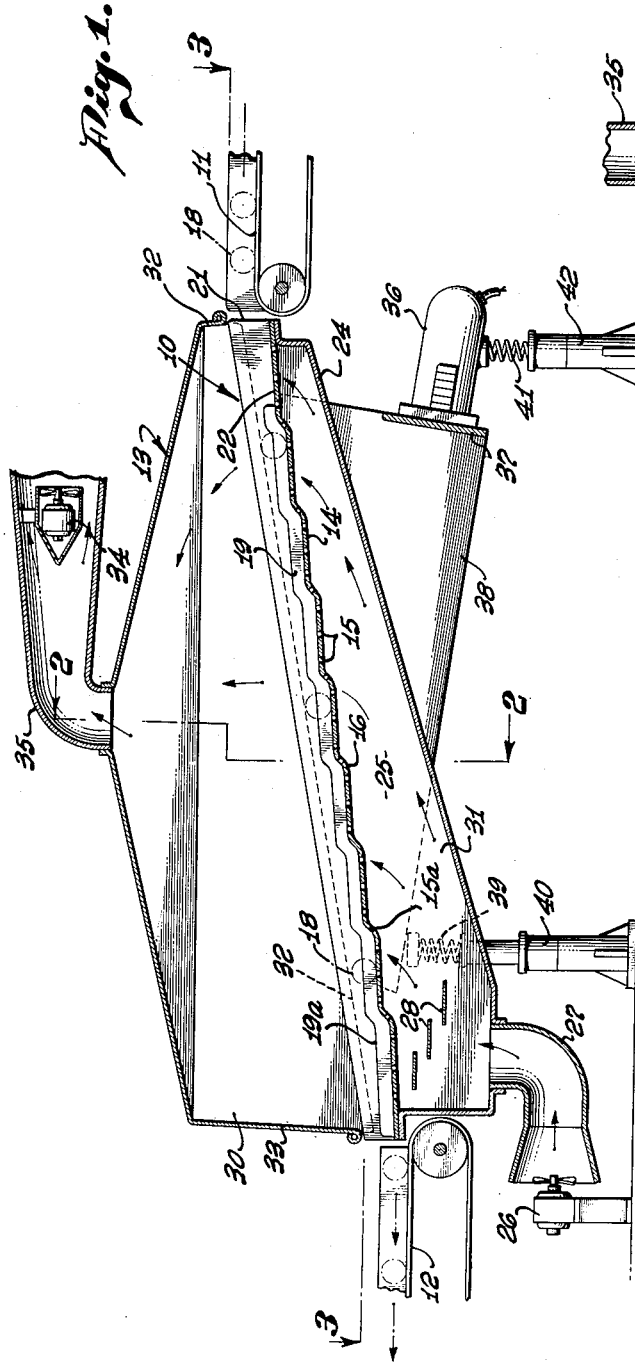
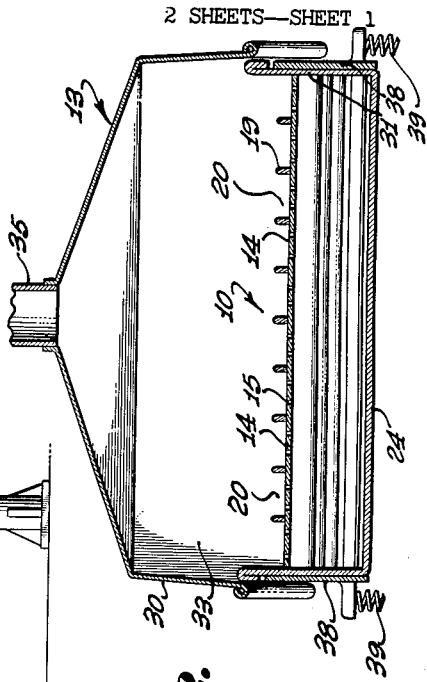
Wayne A. S. Harmon,
INVENTOR.
BY
ATTORNEY.

Feb. 19, 1952 W. A. S. HARMON 2,586,223
PRODUCE UNWRAPPING DEVICE
Filed June 28, 1948 2 SHEETS—SHEET 2
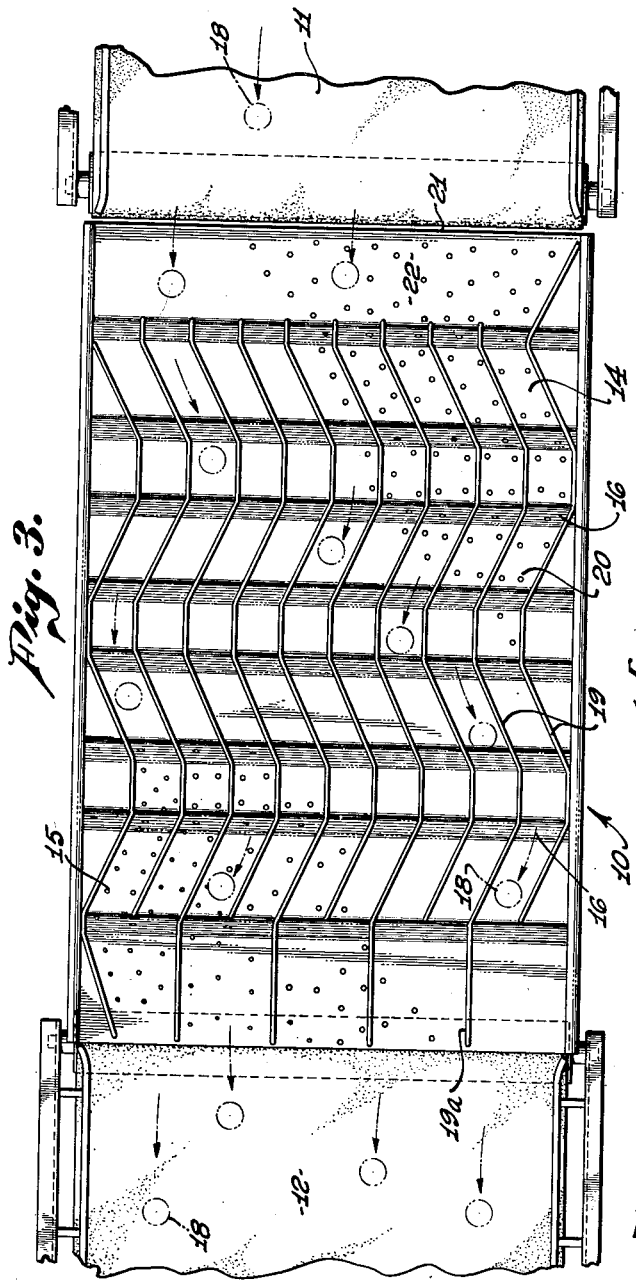
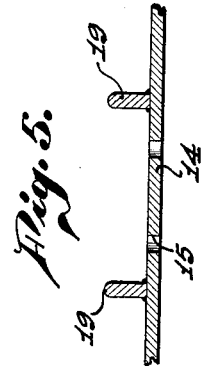
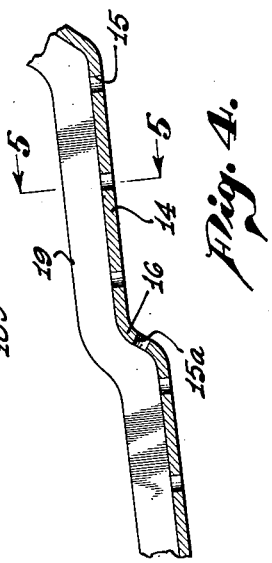
Wayne A. S. Harmon,
INVENTOR.
BY
ATTORNEY.

Patented Feb. 19, 1952

2,586,223

UNITED STATES PATENT OFFICE 2,586,223

PRODUCE UNWRAPPING DEVICE

Wayne A. S. Harmon, Sunnyvale, Calif.

Application June 28, 1948, Serial No. 35,563

7 Claims. (Cl. 209—2)

This invention has to do with improvements in equipment for removing wrappers from produce such as tomatoes, citrus fruit and the like, the present type of apparatus being particularly useful in central packing plants receiving the produce in wrapped condition, and operating to re-package or transfer the produce, without wrappers, to other containers.

My primary object is to provide equipment of simple design and operation characterized by its capacity for removing the usual thin paper wrappers from a continuous flow of the produce, and in a manner such that a single unit will have large capacity for dewrapping the produce.

Generally considered, the invention is predicated upon the concept of blowing the wrappers from the produce from the most advantageous locations, and while the produce is being moved along a course of travel under conditions tending to loosen the wrappers and thus render them susceptible of assured removal by the air streams. Air movement at adequately high velocity against the produce wrappers preferably is accomplished by directing small high velocity air streams from beneath the course of the produce travel, and in a manner such that the air streams so impinge against any opened or loosened portions of the wrappers as to blow the latter upwardly from the produce. It is found advantageous to induce an air draft upwardly from the produce for the dual purpose of maintaining desirably high air jet velocities, and of carrying off the removed wrappers in the induced air stream.

Loosening of the wrappers to condition them for removal by the air jets, is effected by causing the produce to assume such movement along a support, that the resulting frictional effects and relative movements of the support and produce, tend to loosen the wrappers at least sufficiently for them to be blown off by the air jets. Such movements and conditions are established by a combination of effects resulting from the paths which the produce is required to take on the support, and by vibratory movement of the support itself.

In its preferred embodiment the invention employs an apertured support of downwardly stepped formation in the direction of advancement of the fruit, the support having surface guides causing the fruit to have a lateral as well as forward rolling motion, which together with the frictional action of the stepped shape of the support, tend to loosen the wrappers, particularly with the added effect of high frequency vibration of the support. Air jetted upwardly through the support apertures blows off the wrappers into an air stream being induced upwardly from above the support.

All the above mentioned features and objects of the invention as well as the details of an illustrative embodiment, will be understood to better advantage from the following description of the accompanying drawings, in which:

Fig. 1 is a general view showing the apparatus in longitudinal section, i. e., the direction of the produce travel;

Fig. 2 is a transverse section on line 2—2 of Fig. 1;

Fig. 3 is a plan section on line 3—3 of Fig. 1;

Fig. 4 is a fragmentary enlarged section of the produce support; and

Fig. 5 is a fragmentary cross section on line 5—5 of Fig. 4.

The equipment as illustrated in Fig. 1 comprises generally a vibrated support or table assembly 10 to which the wrapped produce is fed by an appropriate conveyor 11, and from which the dewrapped produce is discharged onto conveyor 12 for further disposition. As will later appear, air is discharged upwardly through the supporting table to blow off the produce wrappers, the latter being carried away in an upwardly induced air stream within the hood 13 overlying the table.

In its preferred form, the table structure 10 comprises a plate 14 having perforations 15 distributed over the plate areas contacted by the produce, the plate being of downwardly stepped formation, in the direction of the produce travel, as best illustrated in Fig. 1. As therein illustrated, the plate 14 may be deformed to have smoothly rounded configurations 16 at the stepdown locations, so that in taking the downwardly stepped course, the produce will not be injured, and the rounded contours of the plate will create a rubbing effect tending to loosen the wrappers. At this point it may be mentioned that the pieces of produce, diagrammatically indicated at 18 on the conveyor 11, will be individually wrapped, ordinarily with tissue paper, and that as received on the conveyor 12, the produce will have been freed from its wrappers.

The top surface of the plate 14 carries a series of parallel guide ribs 19 forming between them, ways or channels 20 within which the produce is subjected to lateral as well as longitudinal displacement on the table. As shown in Fig. 1, the major portion of the guide ribs 19 may terminate some distance short of the feed end 21 of the table to permit free reception of the produce on the area 22, beyond which the produce enters the channels 20. The width of the latter may be somewhat in excess of the average dimension of the individual piece of produce, so that the pieces follow one another in more or less line flow through the channels, while being subjected to lateral rolling movement as the pieces are deflected by the angularity of the guides. By virtue of both longitudinal and lateral rolling displacement, the produce is kept in a state of multi-directional frictional engagement with the support, all in a manner tending to free or at least loosen the wrappers sufficiently for them to be blown off the produce by the air streams jetted upwardly through the perforations 15. Some of the guide ribs may be extended at 19a to direct the unwrapped produce in straight line flow onto the conveyor 12.

Referring again to Fig. 1, the table structure 10 may include a bottom shell 24 secured to and overlying plate 14 and forming an air distribution chamber 25 coextensive with the perforated area of the plate. Air may be blown into the chamber 25 in any suitable manner, as by a fan or blower 26 discharging the air through inlet 27. Proper distribution of the air to the plate perforations may be facilitated as by an appropriate arrangement of baffles 28 extending across chamber 25 above the inlet 27. Thus, as will be understood, air is jetted from chamber 25 upwardly at high velocity through the plate perforations 15 and directly against the wrappers of the produce being advanced through the channels 20.

The hood shell 13 comprises side walls 30 depending in overlapping relation with the side walls 31 of chamber 25 extending above the perforated support 14, as particularly illustrated in Fig. 2. The extent of overlapping at 32 between the hood and air chamber side walls, is sufficient to minimize air flow into the hood, while permitting vibratory movement of the table relative thereto. The end walls 32 and 33 are spaced sufficiently above the plate 14 to permit movement of the produce respectively from and onto the conveyors 11 and 12. Any suitable means, such as a baffled fan or blower, conventionally indicated at 34, may be used to induce air flow from the hood 30 through its outlet 35.

The plate and shell assembly 14, 24 is subjected to high frequency vibration in the direction of advancement of the produce, as by an electrical vibrator 36 attached to member 37 interconnecting plates 38 secured to the chamber sides 31, plates 38 being yieldably supported near the forward ends, as by coil springs 39 carried upon appropriate bases 40. The vibrator and rear portion of the chamber and plate assembly, may similarly be supported by coil spring 41 carried by base 42.

When energized, the vibrator 36 vibrates the supporting table at high frequency, and in a direction tending to advance the produce, while subjecting the latter to the described forward and transverse rolling movements within the channels 20 and in such rubbing engagement with the stepped plate 14 and guides 19, as will effectively loosen the wrappers for removal by the combined effects of the air streams jetted through the perforations 15, and the air flow being induced into the hood outlet 35. With further reference to the relation of the air jets to the produce, it will be noted that perforations 15a preferably are located at and across the step junctures at 16 of the plate 14, so that the air jets being discharged from 15a are directed against the wrappers as they are being loosened as a result of rubbing over and down the step surfaces.

I claim:

1. Apparatus for removing wrappers from produce or the like, comprising a horizontally extending support along which individually wrapped pieces of the produce are advanced to loosen the wrappers, said support having a downwardly stepped surface upon which the produce advances, there being unobstructed inlet and outlet paths at the opposite ends of said support along which the produce may move generally horizontally from a supply conveyor onto the support and generally horizontally from the support onto a discharge conveyor, guides carried by said surface of the support and imparting to the produce lateral rolling movement as it rolls forwardly on the support, means for displacing air to flow upwardly through the support, means associated with the support for directing divided high velocity streams of the air against the produce to blow off the wrappers, and means for vibrating said support.

2. Apparatus for removing wrappers from produce or the like, comprising a horizontally extending apertured support along which individually wrapped pieces of the produce are advanced to loosen the wrappers, said support being downwardly stepped in the direction of advancement of the produce, there being unobstructed inlet and outlet paths at the opposite ends of said support along which the produce may move generally horizontally from a supply conveyor onto the support and generally horizontally from the support onto a discharge conveyor, guides carried by the surface of the support and imparting to the produce lateral rolling movement as it rolls forwardly on the support, means for blowing air upwardly through the support apertures to impinge against and blow off the wrappers, and means for vibrating the support.

3. Apparatus for removing wrappers from produce or the like, comprising a horizontally extending apertured support along which individually wrapped pieces of the produce are advanced to loosen the wrappers, said support being downwardly stepped in the direction of advancement of the produce, there being unobstructed inlet and outlet paths at the opposite ends of said support along which the produce may move generally horizontally from a supply conveyor onto the support and generally horizontally from the support onto a discharge conveyor, guides carried by the surface of the support and imparting to the produce lateral rolling movement as it rolls forwardly in the support, means for blowing air upwardly through the support apertures to impinge against and blow off the wrappers, a suction fan inducing airflow upwardly from the support, and means for vibrating the support.

4. Apparatus for removing wrappers from produce or the like, comprising a downwardly stepped horizontally extending support along which individually wrapped pieces of the produce are advanced to loosen the wrappers, said support having apertures in both its horizontal and downwardly extending portions, and means for blowing air upwardly through the support apertures in said horizontal and downward portions to impinge against and blow off the wrappers, the aperture area of said support being small as compared with its imperforate area to direct the air in divided relatively high velocity streams assuring removal of the wrappers.

5. Apparatus for removing wrappers from produce or the like, comprising means for advancing individually wrapped pieces of produce both along and transversely of a course of travel to loosen the wrappers, means for creating high velocity air flow, and means for directing the air flow upwardly from beneath and against the produce during said transverse movement to blow off the wrappers.

6. Apparatus for removing wrappers from produce or the like, comprising means for advancing individually wrapped pieces of produce along a horizontal and downwardly stepped course of travel to loosen the wrappers, means for deflecting the produce transversely of said course of travel during its downward movement at the step down portion of said travel, means for creating high velocity air flow, and means for directing the air flow upwardly from beneath and against the produce to blow off the wrappers.

7. Apparatus for removing wrappers from produce or the like, comprising a horizontally extending apertured support along which individually wrapped pieces of the produce are advanced to loosen the wrappers, said support being downwardly stepped in the direction of advancement of the produce and not upwardly stepped in said direction, means for blowing air upwardly through the support apertures to impinge against and blow off the wrappers, the aperture area of said support being less than its imperforate area to direct the air in relatively high velocity streams assuring removal of the wrappers and means for vibrating the support.

WAYNE A. S. HARMON.

REFERENCES CITED

The following references are of record in the file of this patent:

UNITED STATES PATENTS

| Number | Name | Date |
|---|---|---|
| 149,869 | Lacroix | Apr. 21, 1874 |
| 314,497 | Gelder | Mar. 24, 1885 |
| 362,766 | McKeen | May 10, 1887 |
| 771,273 | Rowland et al. | Oct. 4, 1904 |
| 1,226,263 | Rustin | May 15, 1917 |
| 1,734,318 | Bloom | Nov. 5, 1929 |
| 1,788,230 | Bost | Jan. 6, 1931 |
| 1,853,816 | Janssen | Apr. 12, 1932 |